Sept. 4, 1934.  G. S. KELLEY  1,972,846
DUST DEFLECTOR
Filed Jan. 6, 1932

INVENTOR.
George S. Kelley.
BY
HIS ATTORNEY.

Patented Sept. 4, 1934

1,972,846

UNITED STATES PATENT OFFICE 1,972,846

DUST DEFLECTOR

George S. Kelley, Mount Vernon, N. Y., assignor to Kelley-Atwell Development Corporation, New York, N. Y., a corporation of New York Application January 6, 1932, Serial No. 585,065

2 Claims. (Cl. 255—50)

This invention relates to dust deflectors intended for use in connection with rock drills.

The deflector is more particularly intended for use with drilling apparatus including fixed mountings which, because of their weight or means employed for securing them in position, are inconvenient to shift from the drilling site in order to change drill steels.

In this type of drilling apparatus it is customary to retract the rock drill to the extent that the mounting will permit and then remove the working implement from the chuck mechanism of the drill. When employing drill steels of short length the distance which the rock drill may move on its mounting may be sufficient to permit withdrawal of the drill steel from the drill hole. As the depth of the hole increases, however, and in consequence of which drill steels of considerable length are required, the comparatively short distance which the rock drill may move on its mounting or shell is less than that required for permitting withdrawal of the drill steel from the drill hole. The usual procedure therefore, is to retract the rock drill on its shell, then remove the drill steel from the chuck mechanism of the rock drill, swing the rock drill out of the operative position and remove the drill steel from the drill hole.

In view of the foregoing facts it will therefore be apparent that it would be inconvenient to withdraw a long drill steel from or enter it into a drill hole through an object, such as a deflector, overlying the drill hole, and it is accordingly an object of the invention to enable the deflector to be applied laterally to a drill steel at any point along its length.

Another object of the invention is to enable the operator to seal the opening in the dust deflector through which the drill steel extends and thus assure against the possibility of discharging dust from the drill hole to the adjacent atmosphere during the time continuous and large volumes of pressure fluid are directed from the rock drill through the drill steel into the drill hole to cleanse the surface being drilled.

Other objects will be in part obvious and in part pointed out hereinafter.

Figure 2:
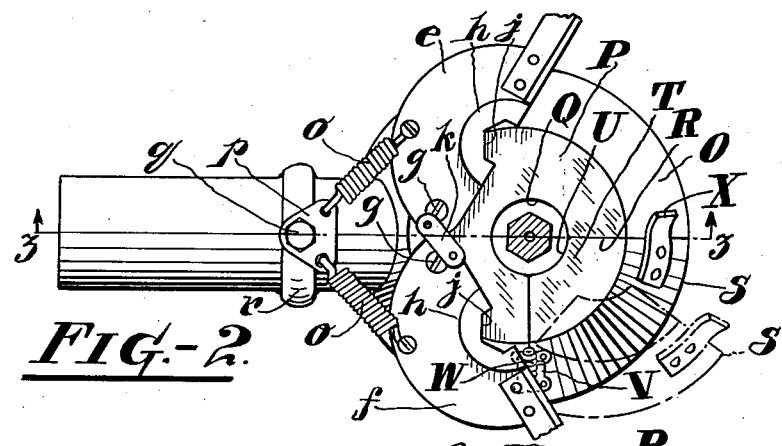
Figure 3:
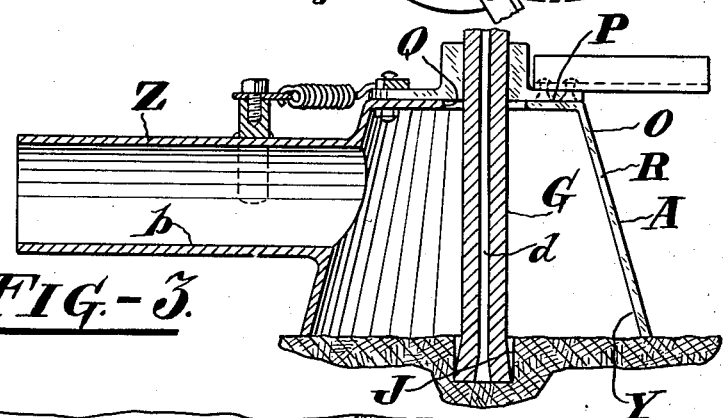
Figure 1:
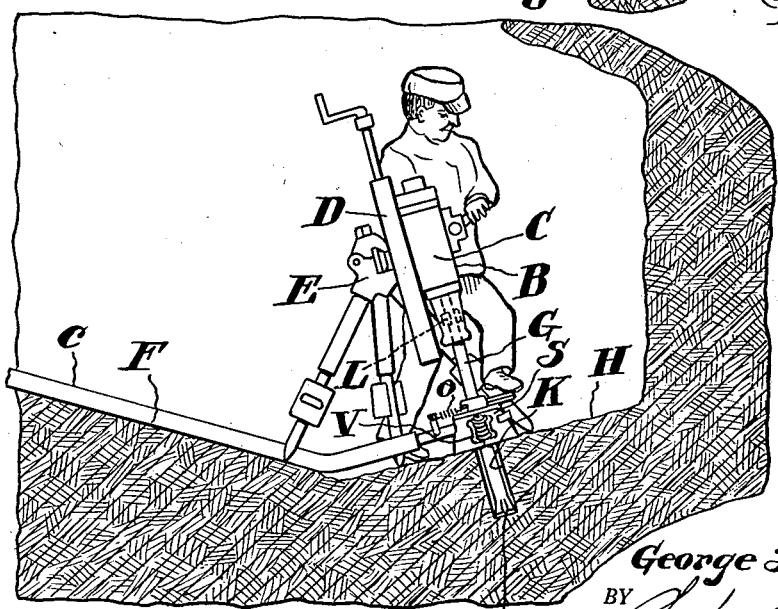

In the drawing accompanying the specification and in which similar reference characters refer to similar parts, Figure 1 is a side elevation of a dust deflector applied to a rock drill and showing these elements installed in the slope of a mine, Figure 2 is a plan view of the dust deflector, and Figure 3 is a longitudinal elevation in section taken through Figure 2 on the line 3—3 looking in the direction indicated by the arrows.

Referring more particularly to the drawing, the dust deflector designated, in general, by A, is shown applied to a drilling mechanism B comprising a rock drill C, a shell D upon which the rock drill C may be slidably mounted in a well known manner, and a tripod E whereby the shell D and, therefore, the rock drill C are supported. The drilling mechanism is shown disposed in a drift or slope F for actuating a working implement G into the rock H.

The drill steel G may be of the usual type having an enlarged or flared cutting bit J for drilling a hole K in the rock H and on or near the rear end of the portion of the drill steel G which extends into the rock drill C are enlargements or lugs L for engagement with the rock drill to prevent ejection of the drill steel therefrom.

The deflector A comprises a casing O illustrated as being in the form of a truncated cone having a wall P at its smaller end and wherein is an aperture Q to accommodate the drill steel G which extends through the casing O to the face of the rock H.

In order to enable the casing O to be readily applied laterally to the drill steel G said casing is provided in the side with an opening R the sides of which radiate from the aperture Q so that the drill steel may pass readily through the opening R and into the aperture Q. The aperture Q is shown, for illustrative purposes, as being located centrally in the end wall P. It is obvious, however, that it may be otherwise located, particularly in such cases as where the deflector is intended for use in connection with drilling holes closely adjacent to a rock face.

A closure is provided for the opening R in the form of a cover S which may be shaped to conform substantially to the curvature of the slope of the casing O. The cover carries at its end a laterally extending portion T which lies in the plane of the wall P and has a curved surface U at its free end to conform to the curvature of the aperture Q of which it forms a bounding surface.

The cover S is pivotally secured to the casing O as by means of a hinge V which may be riveted or otherwise secured to the cover and the casing. Preferably, a spring W is disposed on the hinge V to hold the cover S normally closed. The cover is provided with a clip X which may be grasped for opening the cover.

In the large end of the casing O, that is, the end which seats upon the rock H is the inlet opening Y through which dust and cuttings from the drill hole K enter the casing O. On the side of the casing is a hollow extension Z the interior of which serves as an outlet opening b for the casing and through which air with entrained dust may flow to a conduit c, as for instance, a hose which may be connected at one end to the extension Z and may lead to a suitable evacuating device, such as a blower (not shown) whereby the cuttings are drawn out of the drill hole K.

In order to protect the casing O against undue wear, such as might occur were said casing or, more specifically, the wall P permitted to come into contact with the rapidly rotating drill steel, G, the aperture Q is of somewhat larger diameter than the drill steel and by thus forming the aperture Q of large diameter an ample space is provided for the entrance of atmospheric air into the casing. This is desirable, particularly in such cases as where substantially the entire rim of the casing bears against the rock face with the result that the space for the entrance of atmospheric air into the casing at this point is greatly reduced.

During the operation of drilling there may be occasions when it may be desirable to prevent free intercourse between the interior and the exterior of the casing, as for instance, when the means provided for ordinarily maintaining the drill hole K free of cuttings prove inadequate for this purpose, and in which event pressure fluid, in large and continuous quantities, are introduced from the rock drill C through a passage d in the drill steel G in a well known manner.

Upon the introduction of a large volume of pressure fluid in the bottom of the drill hole the rock particles therein are ejected from the drill hole and in the direction of the aperture Q. In order to prevent the passage of rock particles and dust through the aperture Q to the atmosphere the casing is provided with closure means for the aperture Q consisting in the present instance of a pair of covers e and f in the form of half-disks which are pivotally secured to the outer surface of the wall P by means of bolts g. The covers e and f are provided on their adjacent sides with semi-circular bosses h having recesses j therein, in this instance of polygonal shape, to conform substantially to the contour of the drill steel G.

The covers e and f are preferably provided with a link k which is pivotally connected to one cover rearwardly of the pivot bolt g and connected in like manner at its other end to the other cover forwardly of its pivot bolt g in order to transmit the movement of one cover to the other. The arrangement is such that upon applying pressure to the free end of one cover for closing it the other cover will also be drawn to the closed position.

In order to normally maintain the covers e and f in the open positions, springs o are secured thereto and are connected at their opposite ends to a plate p secured, as by means of a screw q, to a saddle r mounted on the extension Z. The springs o are of the tension type and preferably exert a constant tension on the covers e and f.

In practice, with the drilling apparatus set in position for drilling the hole K the cover S of the deflector may be opened and the deflector may then be applied laterally to the drill steel G and arranged in such position that the drill steel G will extend approximately coaxially through the aperture Q. The cover S may then be released and will be drawn to the closed position and held closed by the spring W acting thereagainst. During the ensuing drilling operation the dust created by the drill steel G may then be drawn through the opening Y, the casing O, the extension Z and the conduit c to any desired destination.

Whenever a condition arises in the drill hole K where additional blowing is required to expel the cuttings therefrom the covers e and f may be closed and air may then be directed into the drill hole to expel the cuttings therefrom. Such cuttings may be withdrawn from the casing in the usual manner. After the drill hole has been thoroughly cleansed the covers may be released and said covers will be drawn to the open position by the springs o.

I claim:

1. A dust deflector comprising a casing having an opening in the side thereof to enable said casing to be applied laterally to a drill steel, said casing having inlet and outlet openings for the passage of dust, a wall at one end of the casing having a normally open aperture to accommodate a drill steel and of greater diameter than the drill steel to normally permit the free passage of air through the aperture into the casing, a plurality of covers pivoted on the outer surface of the end wall cooperating with the drill steel to form a closure for the aperture, and link means pivoted to the covers to cause a counter-action of either cover upon movement of another cover.

2. A dust deflector comprising a casing having an opening in the side thereof to enable said casing to be applied laterally to a drill steel, said casing having inlet and outlet openings for the passage of dust, a wall at one end of the casing having an aperture to accommodate a drill steel and being of greater diameter than the drill steel to normally permit the free passage of air through the aperture into the casing, a pair of normally open covers pivoted to the outer surface of the end wall and cooperating with the drill steel to form a closure for the aperture, and a link pivotally connected to the covers for transmitting the movement of one cover to the other.

GEORGE S. KELLEY.